(12) United States Patent
Maeda et al.

(10) Patent No.: US 7,606,196 B2
(45) Date of Patent: Oct. 20, 2009

(54) RADIO COMMUNICATION SYSTEM, RADIO COMMUNICATION METHOD, AND TRANSMITTER APPARATUS AND RECEIVER APPARATUS SUITABLE FOR USE IN THE SAME

(75) Inventors: Noriyuki Maeda, Yokohama (JP); Hiroyuki Atarashi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 770 days.

(21) Appl. No.: 10/679,488

(22) Filed: Oct. 7, 2003

(65) Prior Publication Data

US 2004/0071105 A1 Apr. 15, 2004

(30) Foreign Application Priority Data

Oct. 9, 2002 (JP) ............................ P2002-296549

(51) Int. Cl.
*H04W 4/00* (2006.01)
*H04J 4/00* (2006.01)
(52) U.S. Cl. ...................................... 370/330; 370/436
(58) Field of Classification Search ................. 370/208, 370/329, 330, 335, 342, 436, 441; 375/130–131; 455/452.1, 452.2
See application file for complete search history.

(56) References Cited

U.S. PATENT DOCUMENTS

| 6,188,717 | B1 * | 2/2001 | Kaiser et al. ................ 375/148 |
| 6,816,555 | B2 * | 11/2004 | Sakoda ........................ 375/260 |
| 7,436,757 | B1 * | 10/2008 | Wilson et al. ............... 370/203 |
| 2002/0159425 | A1 * | 10/2002 | Uesugi et al. ............... 370/342 |
| 2004/0028004 | A1 * | 2/2004 | Hayashi et al. ............. 370/320 |
| 2004/0199846 | A1 * | 10/2004 | Matsumoto et al. ......... 714/748 |
| 2005/0163193 | A1 * | 7/2005 | Maeda et al. ................ 375/130 |
| 2006/0120473 | A1 * | 6/2006 | Baum ........................ 375/260 |

FOREIGN PATENT DOCUMENTS

| EP | 1 124 344 A1 | 8/2001 |
| EP | 1 179 904 A1 | 2/2002 |
| JP | 2000-332724 | 11/2000 |
| JP | 2001-60934 | 3/2001 |

OTHER PUBLICATIONS

Qingxin Chen, et al., "Multicarrier CDMA with Adaptive Frequency Hopping for Mobile Radio Systems", IEEE Journal on Selected Areas in Communications, XP011054569, vol. 14, No. 9, Dec. 1996. pp. 1852-1858.

* cited by examiner

*Primary Examiner*—Nguyen Vo
(74) *Attorney, Agent, or Firm*—Oblon, Spivak, McClelland, Maier & Neustadt, L.L.P.

(57) ABSTRACT

The object of the present invention is to prevent continued reception of unreliable information symbols at the receiver apparatus 200 in the OFDM radio communication system, so that it is possible to improve transmission quality. The radio communication system according to the present invention comprises a transmitter apparatus 100 configured to estimate conditions of propagation paths used in the radio communication, arrange information symbols along the direction of the frequency axis in accordance with a predetermined pattern based on the estimated conditions of propagation paths, and transmit a radio communication signal including the arranged information symbols and a receiver apparatus 200 configured to receive the radio communication signal, and rearrange the information symbol included in the radio communication signal along the direction of the frequency axis in accordance with a reverse pattern to the predetermined pattern.

12 Claims, 15 Drawing Sheets

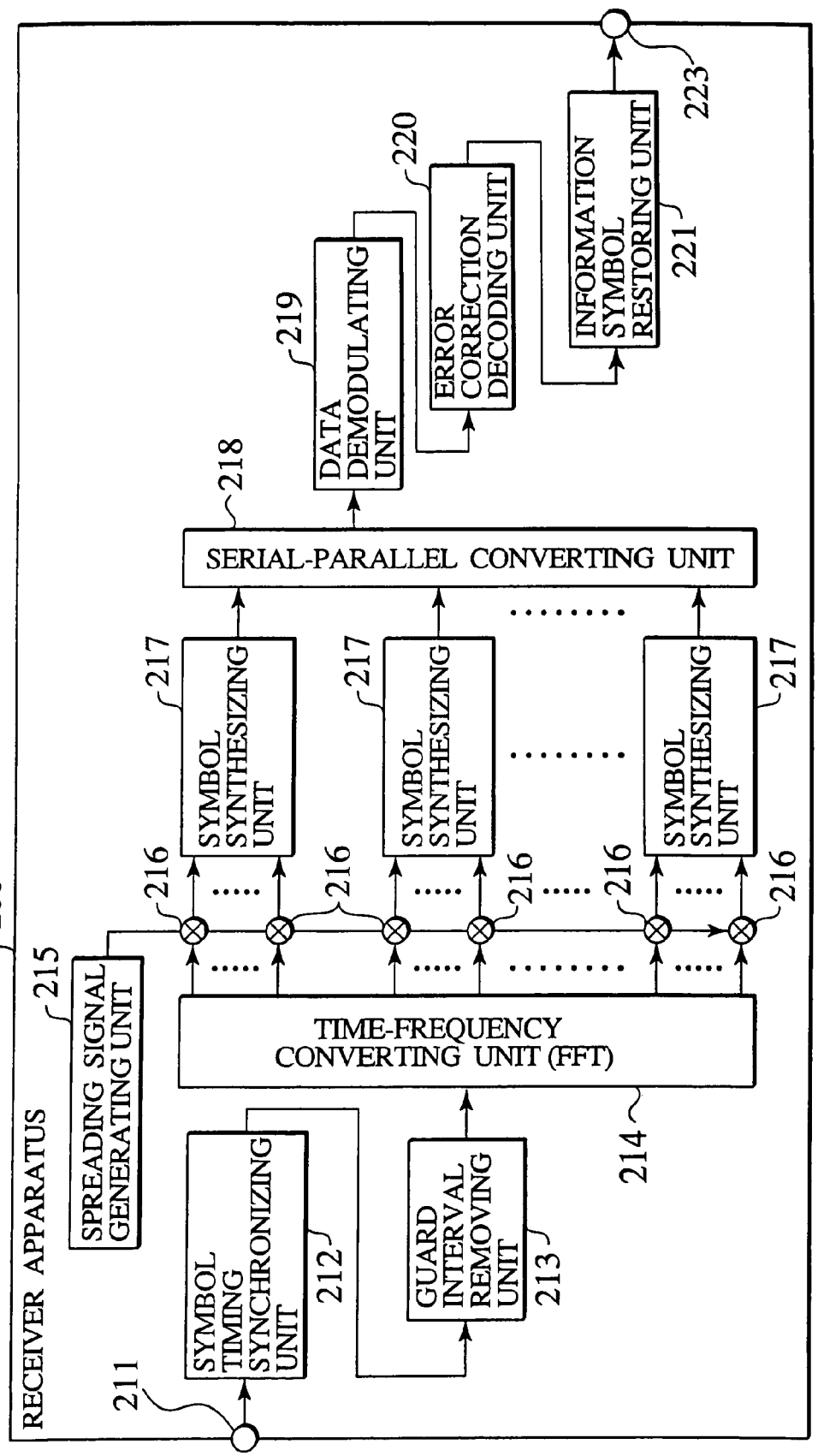

RADIO COMMUNICATION SYSTEM, RADIO COMMUNICATION METHOD, AND TRANSMITTER APPARATUS AND RECEIVER APPARATUS SUITABLE FOR USE IN THE SAME

CROSS REFERENCE TO RELATED APPLICATION

This application is based upon and claims the benefit of priority from the prior Japanese Patent Application No. P2002-296549, filed on Oct. 9, 2002; the entire contents of which are incorporated herein by reference.

BACKGROUND OF THE INVENTION

1. Field of the Invention

The present invention relates to a radio communication system and a radio communication method for performing radio communication by combining the OFDM modulation method and the CDMA modulation method, and to a transmitter apparatus and a receiver apparatus suitable for use in the system and the method 2. Description of the Related Art The "orthogonal frequency and code division multiplexing" (OFCDM) radio communication method has been conventionally known as a radio communication method which combines the "orthogonal frequency division multiplexing" (OFDM) modulation method and the "code division multiple access" (CDMA) modulation method.

The OFCDM radio communication method is based on the multi-carrier CDMA radio communication method, which is now under study for application to a digital mobile communication system.

The multi-carrier CDMA radio communication method is a method of duplicating information symbols along the direction of a frequency axis, multiplying each of the duplicated information symbols by one chip of a spreading code, and then transmitting the chips after spreading in parallel on a plurality of sub-carriers having different frequencies.

In other words, according to the multi-carrier CDMA radio communication method, multiplication using the spreading codes is resultantly executed in the direction of the frequency axis. Therefore, it is possible to realize code multiplexing of a plurality of information channels by use of orthogonal spreading codes.

In addition, according to the multi-carrier CDMA radio communication method, a symbol rate is decreased while a symbol length is increased by parallel transmission using the plurality of sub-carriers. Accordingly, it is possible to reduce an influence of "multi-path interference" which poses a problem in a radio communication environment.

Here, "multi-path interference" is deterioration in transmission quality of radio communication signals, which is attributable to mutual interference of radio communication signals transmitted from a transmitter apparatus because the radio communication signals pass through a plurality of different propagation paths (multiple propagation paths) and thereby reach a receiver apparatus at different timings.

Moreover, the above-described multiple propagation paths cause frequency-selective phasing where fluctuations in conditions in the propagation paths vary depending on the frequency. However, according to the multi-carrier CDMA radio communication method, the radio communication signals are spread along the frequency direction, so that it is possible to improve the transmission quality of the radio communication signals by a frequency diversity effect.

FIG. 1 shows functional blocks in a transmitter apparatus 100 applying the OFCDM radio communication method according to the prior art.

As shown in FIG. 1, the transmitter apparatus 100 applying the OFCDM radio communication method according to the prior art is configured with an information channel signal processing unit 110, an information symbol generating unit 111, an error correction encoding unit 112, a data modulating unit 113, a serial-parallel converting unit 114, symbol duplicating units 115, a spreading signal generating unit 116, multiplying units 117, a signal synthesizing unit 118, a frequency-time converting unit (IFFT) 119, a guard interval inserting unit 120, and an OFCDM outgoing signal outputting unit 121.

The functions of the respective units will be described later. Here, operations of the transmitter apparatus 100 applying the OFCDM radio communication method according to the prior art will be briefly described with reference to FIG. 2.

As shown in FIG. 2, in Step A, the symbol duplicating units 115 of the transmitter apparatus 100 duplicate information symbols generated by the information symbol generating unit 111 along the direction of the frequency axis and the direction of the time axis.

In Step B, each multiplying unit 117 of the transmitter apparatus 100 multiplies each of the information symbols duplicated along the direction of the frequency axis and the direction of the time axis by one chip of a spreading code generated by the spreading signal generating unit 116.

In Step C, the OFCDM outgoing signal outputting unit 121 of the transmitter apparatus 100 performs parallel transmission of the chips after spreading by use of sub-carriers having different frequencies and OFCDM symbols having different timings.

FIG. 3 shows functional blocks of a receiver apparatus 200 applying the OFCDM radio communication method according to the prior art.

As shown in FIG. 3, the receiver apparatus 200 applying the OFCDM radio communication method according to the prior art is configured with an OFCDM incoming signal inputting unit 211, a symbol timing synchronizing unit 212, a guard interval removing unit 213, a time-frequency converting unit (FFT) 214, a spreading signal generating unit 215, multiplying units 216, symbol synthesizing units 217, a serial-parallel converting unit 218, a data demodulating unit 219, an error correction decoding unit 220, an information symbol restoring unit 221, and an outputting unit 223.

The functions of the respective units will be described later. Here, operations of the receiver apparatus 200 applying the OFCDM radio communication method according to the prior art will be briefly described with reference to FIG. 3, FIG. 4A and FIG. 4B.

As shown in FIGS. 4A and 4B, the multiplying units 216 of the receiver apparatus 200 multiply an OFCDM incoming signal received through the OFCDM incoming signal inputting unit 211 by spreading codes generated by the spreading signal generating unit 215, i.e. the spreading codes identical to the spreading codes multiplied in the transmitter apparatus 100, along the direction of the frequency axis (or along the direction of the time axis, or along both of the direction of the frequency axis and the direction of the time axis).

Next, the symbol synthesizing units 217 of the receiver apparatus 200 performs reverse spreading of the OFCDM incoming signal over the respective sub-carriers by synthesizing the signal based on a spreading code cycle.

FIGS. 4A and 4B show an aspect of reverse spreading in which the spreading codes are multiplied only along the direction of the frequency axis.

As shown in FIG. 4A, when fluctuations of propagation paths are constant among the respective sub-carriers, the spreading codes multiplied on the respective information channels are orthogonal to one another. Accordingly, it is possible to restore the signals on the respective information channels completely after reverse spreading.

On the contrary, as shown in FIG. 4B, when the fluctuations of propagation paths vary among the respective sub-carriers, i.e. when the respective sub-carriers are affected by fluctuations of different amplitudes and phases, the signal received after the propagation through the multiple propagation paths loses orthogonalities among the spreading codes. Accordingly, a signal attributable to another information channel remains thereon as a result of interference after reverse spreading and thereby causes a deterioration in transmission quality.

Moreover, particularly when received power is decreased over a plurality of consecutive sub-carriers due to the influence of the multiple propagation paths described above, error correction capability is degraded by the continuing existence of unreliable incoming symbols and thereby causes a deterioration in transmission quality.

A method for solving the problem, i.e. a method for avoiding the continuing flow of unreliable incoming symbols, is known as "interleave", which involves arranging information symbols with a transmitter apparatus in accordance with a predetermined pattern and rearranging of the information symbols with a receiver apparatus in accordance with a reverse pattern to the predetermined pattern.

However, when "interleave" is applied to the conventional OFCDM radio communication method, the amplitude fluctuations of the sub-carriers within the spreading code cycle are increased and the orthogonalities among the spreading codes are lost, whereby interference from a different information channel is increased.

In such a case, it is important to combine spreading processing along the direction of a frequency axis specific to the OFCDM radio communication method appropriately with "interleave".

However, application of "interleave" has been so far examined mainly in terms of application to a conventional multi-carrier radio communication method, therefore, application of the "interleave" to the OFCDM radio communication method, which requires consideration for influences of the orthogonalities among the spreading codes, has not been discussed explicitly.

Moreover, the prior Japanese Patent Application No. P2002-190788 only discloses the concept of changing the arrangement of the respective chips after spreading by shifting the chips stepwise in the direction of increasing or decreasing in the carrier frequency along the frequency axis, and has difficulty in estimating the conditions in the propagation paths and in performing rearrangement at appropriate timing based on a result of the estimation.

BRIEF SUMMARY OF THE INVENTION

The present invention has been made in consideration of the above problems. An object of the present invention is to provide a radio communication system and a radio communication method which realize radio communication in accordance with the OFCDM radio communication method by use of "interleave" in consideration of the spreading processing, and to provide a transmitter apparatus and a receiver apparatus suitable for use in the system and the method.

A first aspect of the present invention is summarized as a radio communication system for performing radio communication by combining the OFDM modulation method and the CDMA modulation method.

The radio communication system comprises a transmitter apparatus configured to estimate conditions of propagation paths used in the radio communication, arrange information symbols along the direction of the frequency axis in accordance with a predetermined pattern based on the estimated conditions of propagation paths, and transmit a radio communication signal including the arranged information symbols; and a receiver apparatus configured to receive the radio communication signal, and rearrange the information symbol included in the radio communication signal along the direction of the frequency axis in accordance with a reverse pattern to the predetermined pattern.

A second aspect of the present invention is summarized as a radio communication method for performing radio communication by combining the OFDM modulation method and the CDMA modulation method, the method comprising the steps of: (A) estimating conditions of propagation paths used in the radio communication, arranging information symbols along the direction of the frequency axis in accordance with a predetermined pattern based on the estimated conditions of propagation paths, and transmitting a radio communication signal including the arranged information symbols, in a transmitter apparatus; and (B) receiving the radio communication signal, and rearranging the information symbol included in the radio communication signal along the direction of the frequency axis in accordance with a reverse pattern to the predetermined pattern, in a receiver apparatus.

A third aspect of the present invention is summarized as a transmitter apparatus used in a radio communication system for performing radio communication by combining the OFDM modulation method and the CDMA modulation method.

The transmitter apparatus estimates conditions of propagation paths used in the radio communication, arranges information symbols along the direction of the frequency axis in accordance with a predetermined pattern based on the estimated conditions of propagation paths, and transmits a radio communication signal including the arranged information symbols.

In the third aspect, the transmitter apparatus may comprise a plurality of symbol arrangers configured to arrange the information symbols along the direction of the frequency axis in accordance with the predetermined pattern; a propagation path condition estimator configured to estimate the conditions of propagation paths; a symbol arrangement scheme selector configured to select the symbol arranger for arranging the information symbols from among the plurality of symbol arrangers, based on the estimated conditions of propagation paths; and a signal transmitter configured to transmit the radio communication signal including the arranged information symbols.

In the third aspect, the plurality of symbol arrangers may comprise a first symbol arrangers configured to arrange the information symbols after error correction encoding along the direction of the frequency axis in accordance with the predetermined pattern; a second symbol arrangers configured to arrange the information symbols after data modulation along the direction of the frequency axis in accordance with the predetermined pattern; and a third symbol arrangers configured to arrange the chips which spread the information symbols along the direction of the frequency axis in accordance with the predetermined pattern.

In the third aspect, the transmitter apparatus may comprise a pattern selector configured to select the predetermined pattern based on the estimated conditions of propagation paths;

a symbol arranger configured to arrange the information symbols along the direction of the frequency axis in accordance with the selected predetermined pattern; and a signal transmitter configured to transmit the radio communication signal including the arranged information symbols.

In the third aspect, the symbol arranger may arrange the information symbols after error correction encoding along the direction of the frequency axis in accordance with the predetermined pattern.

In the third aspect, the symbol arranger may arrange the information symbols after data modulation along the direction of the frequency axis in accordance with the predetermined pattern.

In the third aspect, the symbol arranger may arrange chips which spread the information symbols along the direction of the frequency axis in accordance with the predetermined pattern.

In the third aspect, the symbol arrangement may be performed along both the direction of the frequency axis and the direction of the time axis.

A fourth aspect of the present invention is summarized as a receiver apparatus used in a radio communication system for performing radio communication by combining the OFDM modulation method and the CDMA modulation method The receiver apparatus is configured to receive a radio communication signal from a transmitter, and rearrange information symbol included in the radio communication signal along the direction of the frequency axis in accordance with a reverse pattern to a predetermined pattern. Here, a transmitter apparatus estimates conditions of propagation paths used in the radio communication, arranges the information symbols along the direction of the frequency axis in accordance with the predetermined pattern based on the estimated conditions of propagation paths, and transmits the radio communication signal including the arranged information symbols.

In the fourth aspect, the receiver apparatus may comprise a signal receiver configured to receive the radio communication signal; and a plurality of symbol rearranger configured to rearrange the information symbol included in the radio communication signal along the direction of the frequency axis in accordance with the reverse pattern to the predetermined pattern, and the symbol rearranger which is selected from among the plurality of the symbol rearranger may rearrange the information symbols.

In the fourth aspect, the plurality of symbol rearranger may comprise a first symbol rearranger configured to rearrange the information symbol after data demodulation along the direction of the frequency axis in accordance with the reverse pattern to the predetermined pattern; a second symbol rearranger configured to rearrange the information symbol after reverse spreading along the direction of the frequency axis in accordance with the reverse pattern to the predetermined pattern; and a third symbol rearranger configured to rearrange chips after the time-frequency conversion along the direction of the frequency axis in accordance with the reverse pattern to the predetermined pattern, the chips spreading the information symbols.

In the fourth aspect, the receiver apparatus may comprise a signal receiver configured to receive the radio communication signal; and a symbol rearranger configured to rearrange the information symbol included in the radio communication signal along the direction of the frequency axis in accordance with the reverse pattern to the predetermined pattern.

In the fourth aspect, the symbol rearranger may rearrange the information symbol after data demodulation along the direction of the frequency axis in accordance with the reverse pattern to the predetermined pattern.

In the fourth aspect, the symbol rearranger may rearrange the information symbol after reverse spreading along the direction of the frequency axis in accordance with the reverse pattern to the predetermined pattern.

In the fourth aspect, the symbol rearranger may rearrange chips after the time-frequency conversion along the direction of the frequency axis in accordance with the reverse pattern to the predetermined pattern. Here, the chips spread the information symbols.

In the above aspects, the symbol rearrangement may be performed along both the direction of the frequency axis and the direction of the time axis. In the above aspects, the symbol rearrangement may be performed along at least one of the direction of the frequency axis or the direction of the time axis.

BRIEF DESCRIPTION OF THE SEVERAL VIEWS OF THE DRAWINGS

FIG. 3 is a functional block diagram of a receiver apparatus applying the OFCDM radio communication method according to the prior art.

DETAILED DESCRIPTION OF THE INVENTION

A Configuration of a Radio Communication System According to a First Embodiment of the Present Invention A configuration of a radio communication system according to a first embodiment of the present invention will be described with reference to FIG. 5 and FIG. 6.

The radio communication system of this embodiment is configured with a transmitter apparatus 100 and a receiver apparatus 200, and is designed to perform radio communication by combining the OFDM modulation method and the CDMA modulation method.

Figure 1:
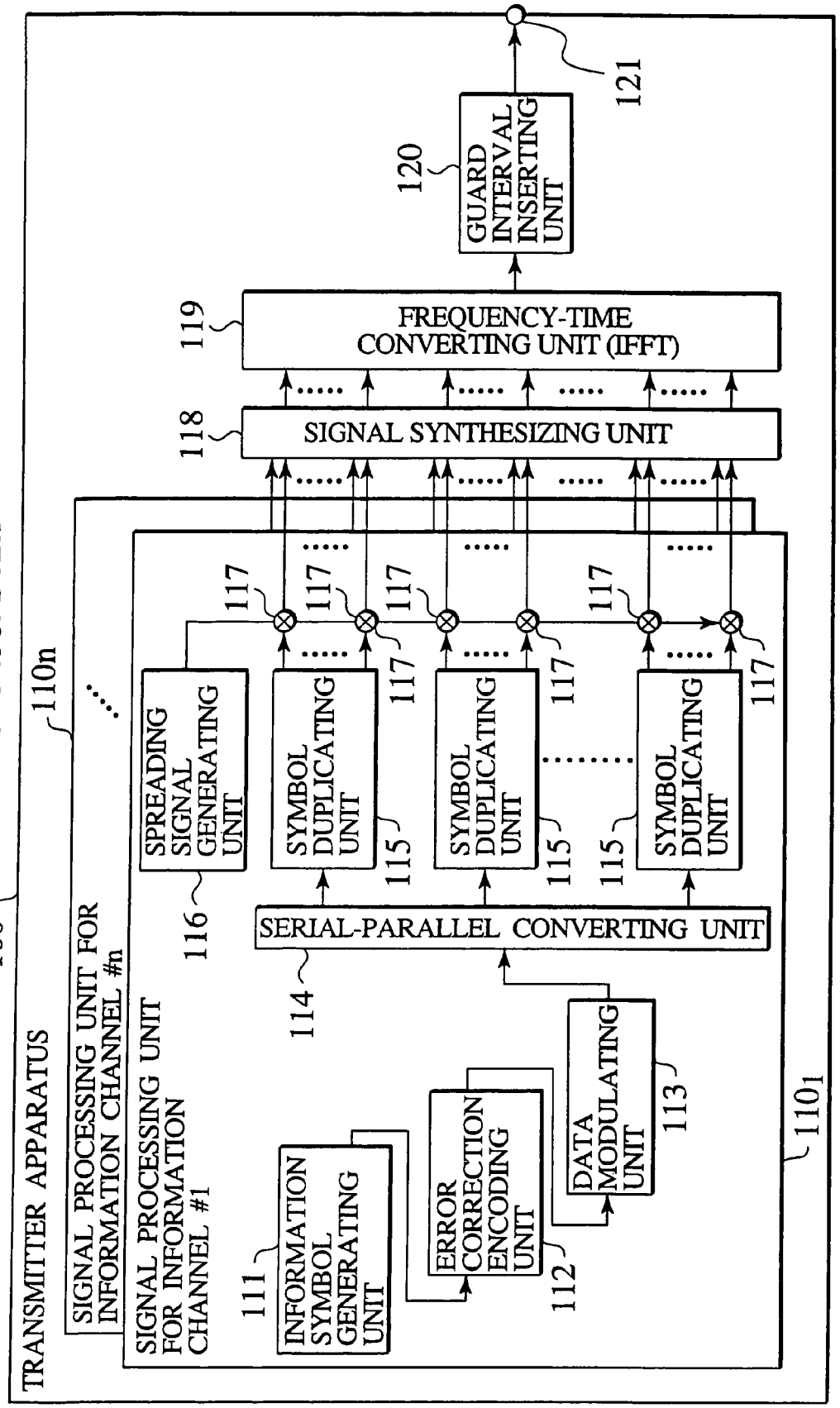
FIG. 1 is a functional block diagram of a transmitter apparatus applying the OFCDM radio communication method according to the prior art.
Figure 2:
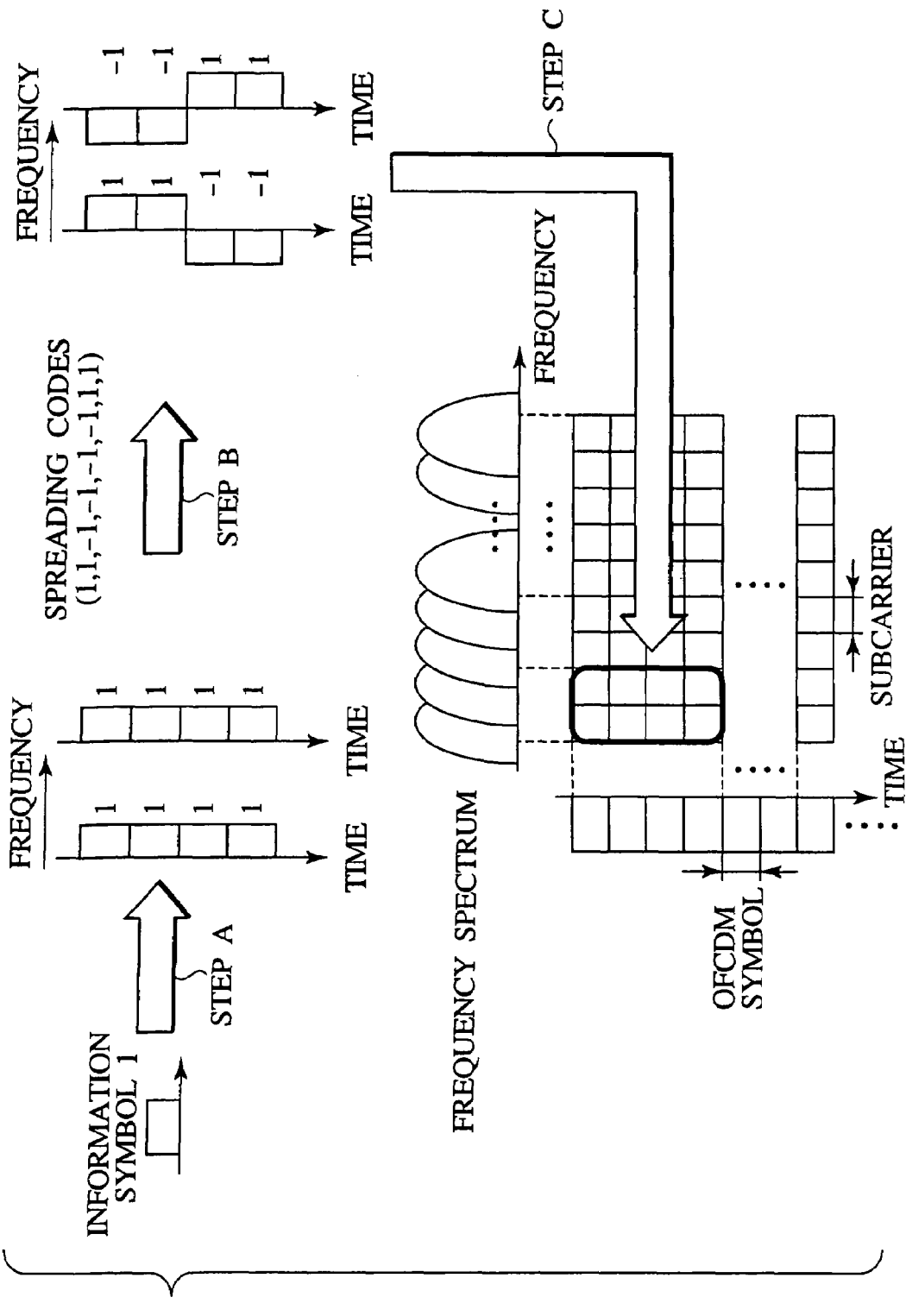
FIG. 2 is a view for explaining operations of the transmitter apparatus applying the OFCDM radio communication method according to the prior art.
Figure 4A:
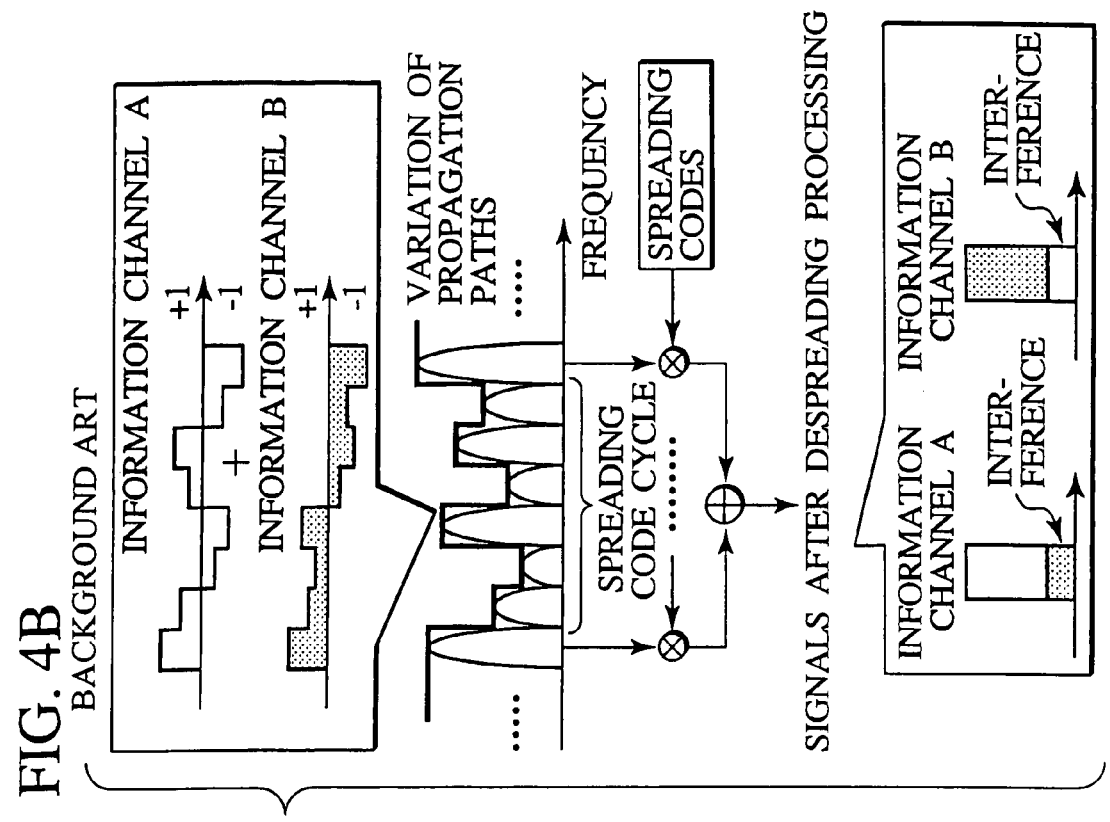
FIGS. 4A and 4B are views for explaining operations of the receiver apparatus applying the OFCDM radio communication method according to the prior art.
Figure 4B:
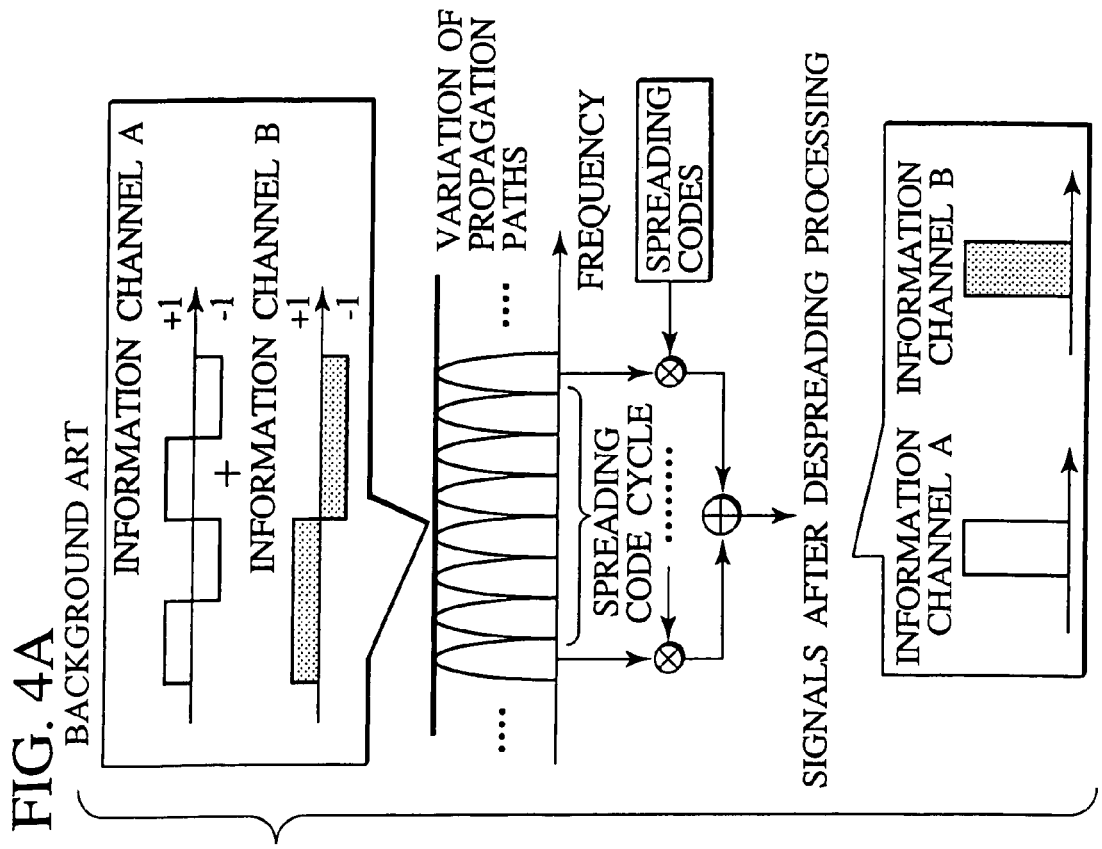
Figure 5:
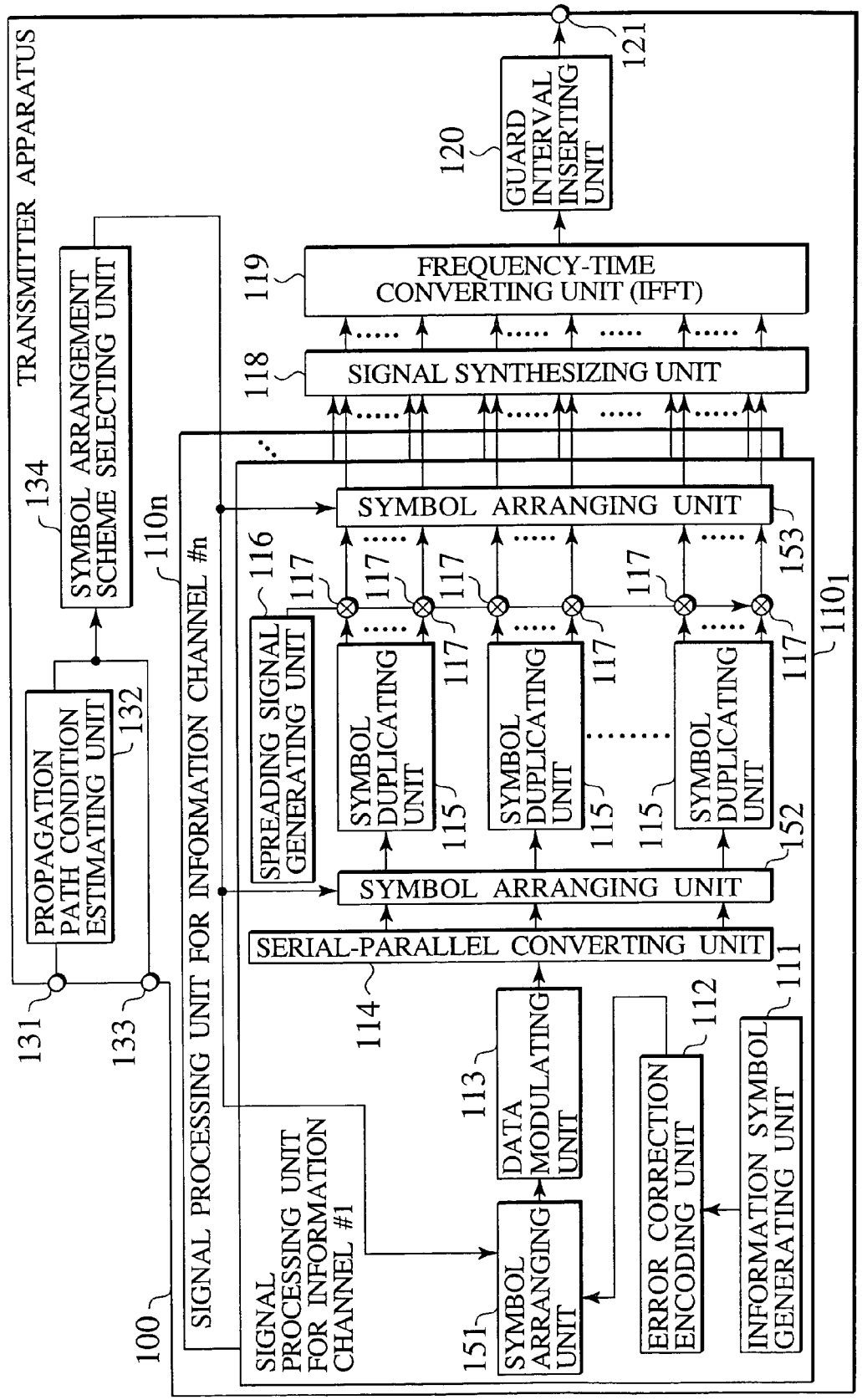
FIG. 5 is a functional block diagram of a transmitter apparatus in a radio communication system according to a first embodiment of the present invention.

As shown in FIG. 5, the transmitter apparatus 100 of this embodiment is configured with an information symbol generating unit 111, an error correction encoding unit 112, a data modulating unit 113, a serial-parallel converting unit 114, symbol duplicating units 115, a spreading signal generating unit 116, multiplying units 117, a signal synthesizing unit 118, a frequency-time converting unit (IFFT) 119, a guard interval inserting unit 120, an OFCDM outgoing signal outputting unit 121, a control channel incoming signal inputting unit 131, a propagation path condition estimating unit 132, a transmission parameter information inputting unit 133, a symbol arrangement scheme selecting unit 134, and a plurality of symbol arranging units 151 to 153.

Each of the information channel signal processing units $110_1$ to $110_n$ which is configured to perform signal processing on each of the information channels 1 to N is configured with the information symbol generating unit 111, the error correction encoding unit 112, the data modulating unit 113, the serial-parallel converting unit 114, the symbol duplicating units 115, the spreading signal generating unit 116, the multiplying units 117, and the plurality of symbol arranging units 151 and 152.

The information symbol generating unit 111 is configured to generate an information symbol to be transmitted through each information channel. The error correction encoding unit 112 is configured to perform predetermined error correction encoding on the information symbol in order to allow the receiver apparatus 200 to perform error correction decoding. The error correction encoding unit 112 performs error correction encoding such as turbo encoding.

The data modulating unit 113 is configured to perform data modulation, such as quadrature phase shift keying (QPSK) modulation, on the error correction encoded information symbol. The serial-parallel converting unit 114 is configured to perform serial-parallel conversion of the data modulated information symbol to simultaneously transmit a plurality of information symbols.

The symbol duplicating unit 115 is configured to duplicate the serial-parallel converted information symbol in the number equal to a spreading cycle of the spreading codes. The spreading signal generating unit 116 is configured to generate a spreading code (a spreading signal) corresponding to each information channel.

The multiplying unit 117 is configured to multiply each of the information signals duplicated by the symbol duplicating unit 115, by the spreading code which is generated by the spreading signal generating unit 116.

The signal synthesizing unit 118 is configured to multiplex the information symbol corresponding to each information channel. The frequency-time converting unit (IFFT) 119 is configured to perform frequency-time conversion (IFFT) on the multiplexed information symbol and thereby to generate an OFCDM outgoing signal.

The guard interval inserting unit 120 is configured to insert a guard interval to each information symbol, so as to reduce an influence of interference between the symbols attributable to a radio communication signal (the OFCDM outgoing signal) reaching the receiver apparatus 200 late due to an influence by the multiple propagation paths.

The OFCDM outgoing signal outputting unit 121 constitutes a signal transmitter configured to transmit an OFCDM outgoing signal including the spread parallel symbols by radio communication using carriers having various frequencies.

The control channel incoming signal inputting unit 131 is configured to receive a control channel which includes propagation path information such as an incoming signal-to-interference and noise ratio (SINR), delay spread or a maximum Doppler frequency.

The control channel incoming signal inputting unit 131 can receive the above-described control channel from the receiver apparatus 200 in any radio communication method such as the OFCDM communication method, the MC-CDMA communication method, the MC/DS-CDMA communication method, the OFDM communication method, the DS-CDMA communication n method, the TDMA communication method or the FDMA communication method.

The propagation path condition estimating unit 132 is configured to estimate conditions of propagation paths used in the radio communication between the transmitter apparatus 100 and the receiver apparatus 200, based on the propagation path information in the control channel received by the control channel incoming signal inputting unit 131.

The transmission parameter information inputting unit 133 is configured to receive transmission parameter information such as a spreading direction (the direction of the frequency axis or the direction of the time axis), the spreading cycle, the data modulation method, the number of multiplexed codes or an error correction encoding rate.

The symbol arrangement scheme selecting unit 134 is configured to select the symbol arranging unit for arranging the information symbols from among the plurality of symbol arranging units 151 to 153, based on the propagation path conditions estimated by the propagation path condition estimating unit 132 and the transmission parameter information inputted through the transmission parameter information inputting unit 133.

For example, when the spreading cycle is 1, i.e. in the case of the OFDM modulation method, the symbol arrangement scheme selecting unit 134 can select the symbol arrangement scheme by selecting the symbol arranging unit for arranging the information symbols from among the plurality of symbol arranging units 151 to 153, based on the propagation path conditions and the transmission parameter information.

The symbol arranging units 151 to 153 are configured to arrange the information symbols along the direction of the frequency axis or the direction of the time axis in accordance with a predetermined pattern in response to a result of selection by the symbol arrangement scheme selecting unit 134.

To be more specific, the symbol arranging units 151 to 153 arrange the information symbols along the direction of the frequency axis or the direction of the time axis such that reception of the unreliable information symbols does not continue in the receiver apparatus 200.

The symbol arranging unit 151 constitutes a first symbol arranger configured to arrange the information symbols after error correction encoding by the error correction encoding unit 112 along the direction of the frequency axis or the direction of the time axis in accordance with a predetermined pattern.

Meanwhile, the symbol arranging unit 152 constitutes a second symbol arranger configured to arrange the information symbols after the modulation by the data modulating unit 113 and after the serial-parallel conversion by the serial-parallel converting unit 114 along the direction of the frequency axis or the direction of the time axis in accordance with a predetermined pattern.

Meanwhile, the symbol arranging unit 153 constitutes a third symbol arranger configured to arrange the chips, which spread the information symbols by the multiplying units 117, along the direction of the frequency axis or the direction of the time axis in accordance with a predetermined pattern.

Figure 6:
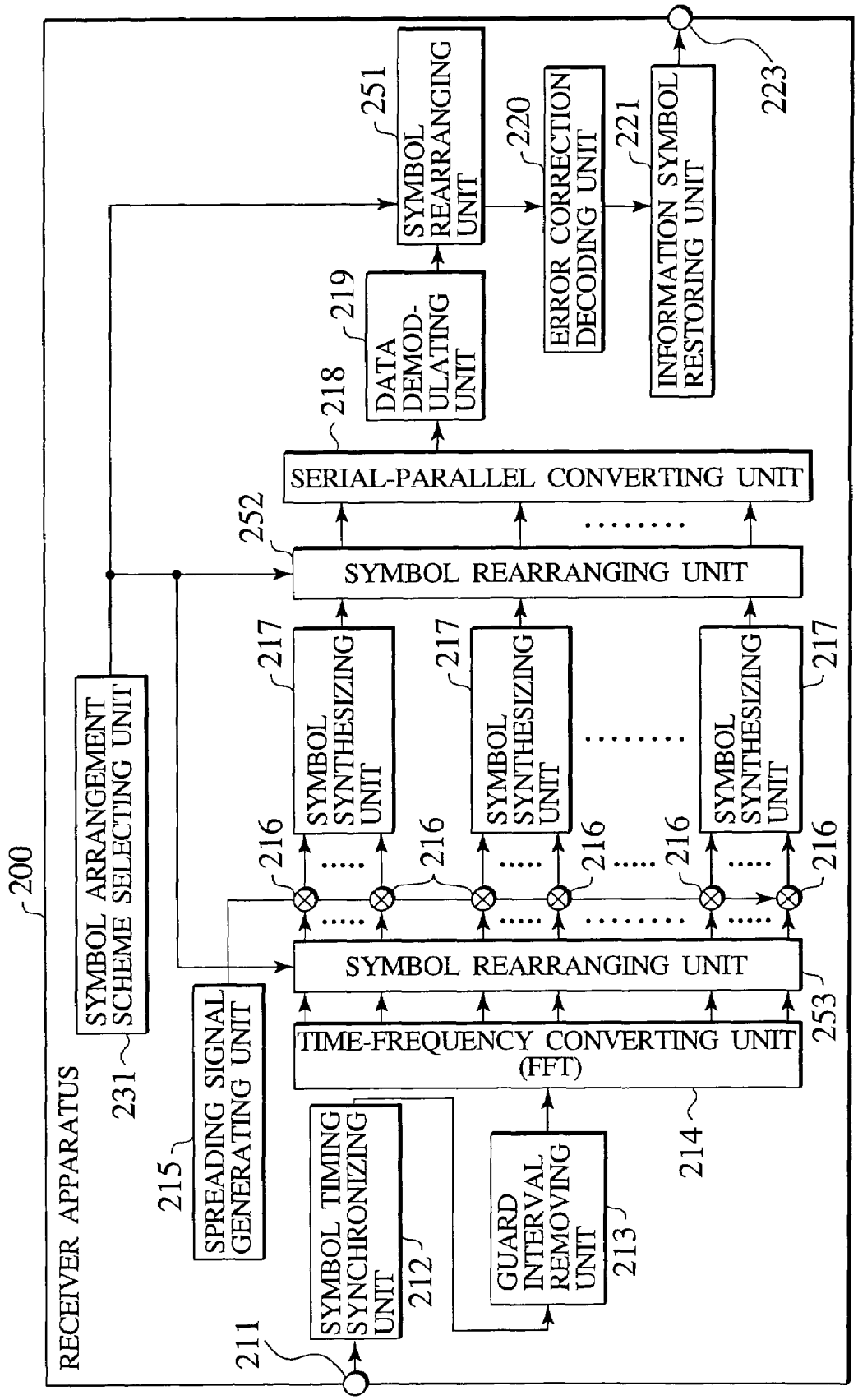
FIG. 6 is a functional block diagram of a receiver apparatus in the radio communication system according to the first embodiment of the present invention.

As shown in FIG. 6, the receiver apparatus 200 of this embodiment is configured with an OFCDM incoming signal inputting unit 211, a symbol timing synchronizing unit 212, a guard interval removing unit 213, a time-frequency converting unit (FFT) 214, a spreading signal generating unit 215, multiplying units 216, symbol synthesizing units 217, a serial-parallel converting unit 218, a data demodulating unit 219, an error correction decoding unit 220, an information symbol restoring unit 221, an outputting unit 223, a symbol arrangement scheme selecting unit 231, and a plurality of symbol rearranging units 251 to 253.

The OFCDM incoming signal inputting unit 211 constitutes a signal receiver configured to receive an OFCDM incoming signal (a radio communication signal) transmitted from the transmitter apparatus 100.

The symbol timing synchronizing unit 212 is configured to establish a symbol timing cycle concerning the received OFCDM incoming signal. The guard interval removing unit 213 is configured to remove the guard interval included in the received OFCDM incoming signal.

The time-frequency converting unit (FFT) 214 is configured to separate the OFCDM incoming signal after the guard interval is removed into components of the respective sub-carrier frequencies by performing time-frequency conversion (FFT).

The spreading signal generating unit 215 is configured to generate a spreading signal (a spreading code) corresponding to each information channel as similar to the spreading signal generating unit 116 of the transmitter apparatus 100.

The multiplying unit 216 is configured to multiply each of the information signals separated into the components of the respective sub-carrier frequencies by the time-frequency converting unit (FFT) 214, by the spreading code which is generated by the spreading signal generating unit 215.

The symbol synthesizing unit 217 is configured to restore (reverse spread) the information symbol before spreading by synthesizing the information symbol being multiplied by the spreading codes by the multiplying units 216 along the spreading cycle.

The serial-parallel converting unit 218 is configured to perform serial-parallel conversion of the restored information symbol. The data demodulating unit 219 is configured to perform data demodulation on the serial-parallel converted information symbol. The error correction decoding unit 220 is configured to perform error correction decoding on the information symbol after the data demodulation.

The information symbol restoring unit 221 is configured to restore the information symbol after error correction decoding to the information symbol which is originally generated by the information symbol generating unit 111 of the transmitter apparatus 100. The outputting unit 223 is configured to output the information symbol restored by the information symbol restoring unit 221.

The symbol arrangement scheme selecting unit 231 is configured to select the symbol rearranging unit for rearranging the information symbol from among the plurality of symbol rearranging units 251 to 253.

For example, the symbol arrangement scheme selecting unit 231 may select the symbol rearranging unit for rearranging the information symbol from among the plurality of symbol rearranging units 251 to 253 based on an instruction from the transmitter apparatus 100.

Alternatively, the symbol arrangement scheme selecting unit 231 may select the symbol rearranging unit for rearranging the information symbol from among the plurality of symbol rearranging units 251 to 253 based on the estimated propagation path conditions or the known transmission parameter information.

The plurality of symbol rearranging units 251 to 253 are configured to rearrange the information symbol included in the OFCDM incoming signal (the radio communication signal) along the direction of the frequency axis or the direction of the time axis in accordance with a reverse pattern to the predetermined pattern in response to an instruction from the symbol arrangement scheme selecting unit 231.

The symbol rearranging unit 251 constitutes a first symbol rearranger configured to rearrange the information symbol after the data demodulation by the data demodulating unit 219 along the direction of the frequency axis or the direction of the time axis in accordance with a reverse pattern to the predetermined pattern.

The symbol rearranging unit 252 constitutes a second symbol rearranger configured to rearrange the information symbol after reverse spreading by the multiplying unit 216 and after the synthesis by the symbol synthesizing unit 217 along the direction of the frequency axis or the direction of the time axis in accordance with a reverse pattern to the predetermined pattern.

The symbol rearranging unit 253 constitutes a third symbol rearranger configured to rearrange the chips after the time-frequency conversion (FFT) by the time-frequency converting unit 214 along the direction of the frequency axis or the direction of the time axis in accordance with a reverse pattern to the predetermined pattern.

[An Operation of the Radio Communication System According to the Embodiment]

Figure 7:
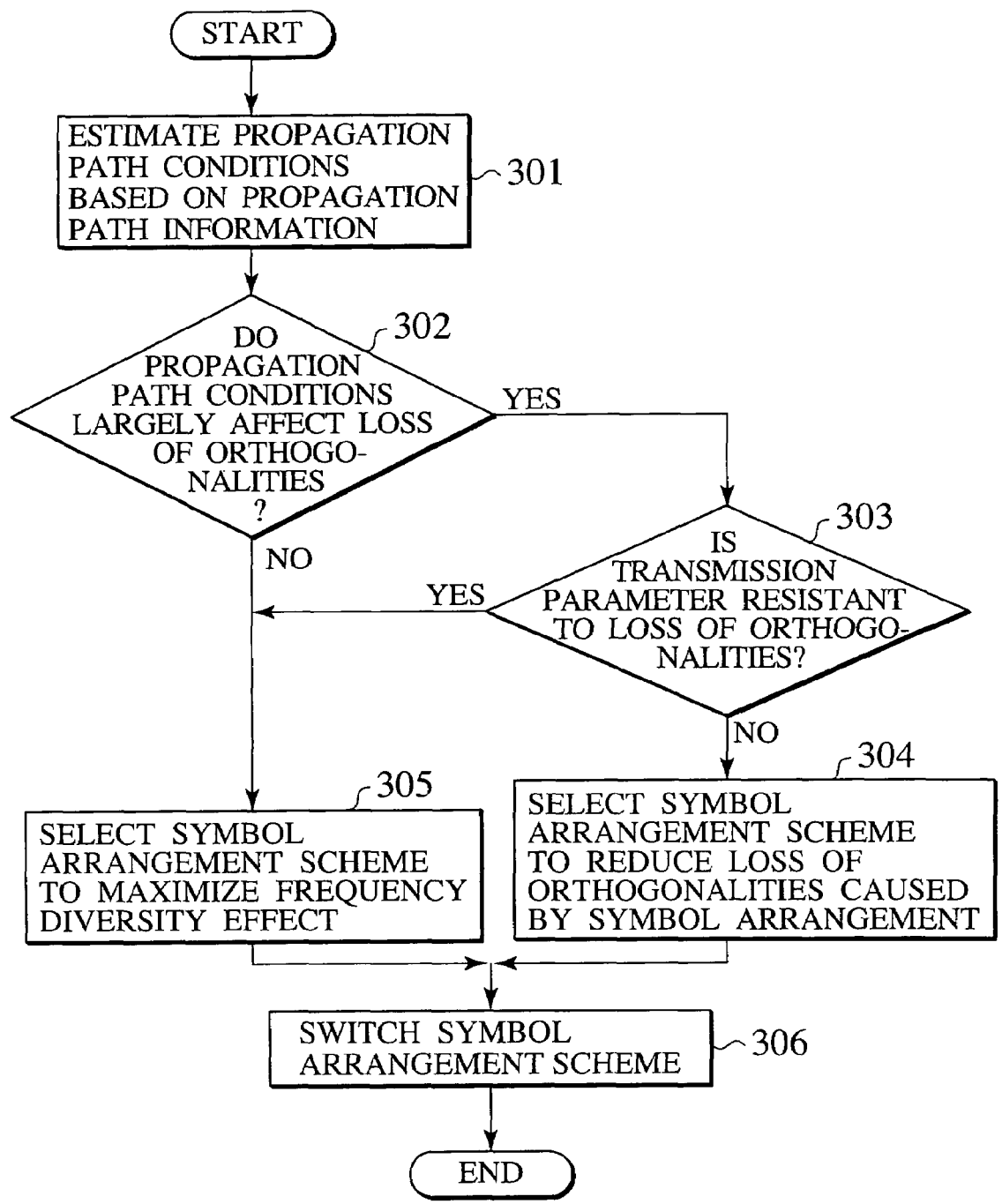
FIG. 7 is a flowchart showing operations of the transmitter apparatus in the radio communication system according to the first embodiment of the present invention.

An operation of the radio communication system of this embodiment will be described with reference to FIG. 7. FIG. 7 shows the operation of the transmitter apparatus 100 of the radio communication system of this embodiment.

As shown in FIG. 7, in Step 301, the propagation path condition estimating unit 132 of the transmitter apparatus 100 estimates the propagation path conditions between the transmitter apparatus 100 and the receiver apparatus 200 based on the propagation path information such as the incoming SINR, the delay spread or the maximum Doppler frequency.

In Step 302, the symbol arrangement scheme selecting unit 134 of the transmitter apparatus 100 checks whether the estimated propagation path conditions largely affect the loss of orthogonalities among the spreading codes or not.

When the estimated propagation path conditions largely affect the loss of the orthogonalities among the spreading codes, then in Step 303, the symbol arrangement scheme selecting unit 134 checks whether the transmission parameter information (such as the spreading direction, the spreading cycle, the modulation method, the number of the multiplexed codes or the error correction encoding rate) obtained through the transmission parameter information inputting unit 133 is resistant to the loss of the orthogonalities among the spreading codes or not.

When the transmission parameter information is not resistant to the loss of the orthogonalities among the spreading codes, then in Step 304, the symbol arrangement scheme selecting unit 134 selects the symbol arranging unit for arranging the information symbols from among the plurality of symbol arranging units 151 to 153, so as to reduce the loss of the orthogonalities among the spreading codes caused by symbol arrangement.

For example, when a modulation method with low resistance to interference among the information channels attributable to the loss of the orthogonalities among the spreading codes (such as the 16-QAM modulation method) is used as the transmission parameter information, the symbol arrangement scheme selecting unit 134 switches the arrangement scheme so as to perform symbol arrangement on bits after error correction encoding. In other words, the symbol arrangement scheme selecting unit 134 selects the symbol arranging unit 151 for performing the symbol arrangement.

As a result, reception of unreliable information symbols will not continue at the receiver apparatus 200 while avoiding an increase in the interference among the information channels. Accordingly, it is possible to improve a transmission characteristic as compared to other schemes.

On the other hand, when the estimated propagation path conditions do not largely affect the loss of the orthogonalities among the spreading codes, or when the transmission parameter information is resistant to the loss of the orthogonalities among the spreading codes, then in Step 305, the symbol arrangement scheme selecting unit 134 selects the symbol arranging unit for arranging the information symbols from among the plurality of symbol arranging units 151 to 153, so as to maximize a frequency diversity effect.

For example, when a modulation method with high resistance to the interference among the information channels attributable to the loss of the orthogonalities among the spreading codes (such as the QPSK modulation method) is used as the transmission parameter information, the symbol arrangement scheme selecting unit 134 switches the arrangement scheme so as to perform the symbol arrangement on bits after spreading. In other words, the symbol arrangement scheme selecting unit 134 selects the symbol arranging unit 153 for performing the symbol arrangement.

As a result, although the interference among the information channels is increased, the reception of the unreliable information symbols will not continue more effectively. Accordingly, it is possible to improve the transmission characteristic as compared to other schemes.

In Step 306, the symbol arranging unit selected by the symbol arrangement scheme selecting unit 134 in Step 304 or Step 305 performs the arrangement of the information symbols.

[Functions and Effects of the Radio Communication System According to the Embodiment]

According to the radio communication system of this embodiment, the symbol arranging units 151 to 153 of the transmitter apparatus 100 arrange the information symbols along the direction of the frequency axis or the direction of the time axis in accordance with the predetermined pattern based on the propagation path conditions estimated by the propagation path condition estimating unit 132, and the symbol rearranging units 251 to 253 of the receiver apparatus 200 rearrange the information symbols included in the radio communication signal along the direction of the frequency axis or the direction of the time axis in accordance with a reverse pattern to the predetermined pattern based on the propagation path conditions. Therefore, it is possible to avoid a problem such as the continued reception of unreliable information symbols at the receiver apparatus 200.

[A Radio Communication System According to a Second Embodiment of the Present Invention]

A radio communication system according to a second embodiment of the present invention will be described with reference to FIG. 8 to FIG. 10. Here, the radio communication system of this embodiment will be described below mainly regarding differences from the radio communication system according to the first embodiment.

Figure 8:
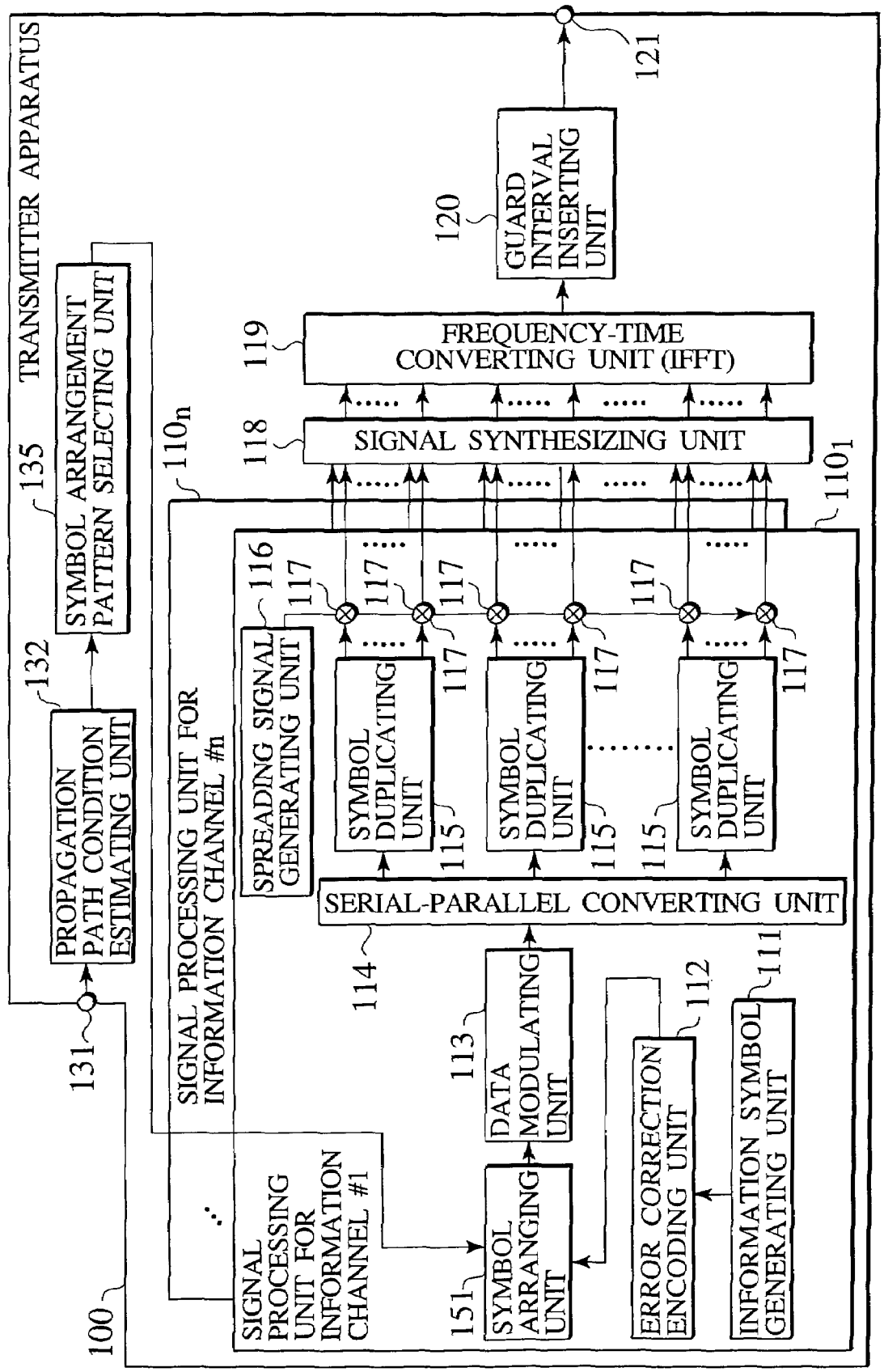
FIG. 8 is a functional block diagram of a transmitter apparatus in a radio communication system according to a second embodiment of the present invention.

As shown in FIG. 8, the transmitter apparatus 100 of this embodiment includes a symbol arrangement pattern selecting unit 135 instead of the transmission parameter information inputting unit 133 and the symbol arrangement scheme selecting unit 134 which are provided to the transmitter apparatus 100 according to the first embodiment.

Moreover, the transmitter apparatus 100 of this embodiment includes only the symbol arranging unit 151 instead of the plurality of symbol arranging units 151 to 153 which are provided to the transmitter apparatus 100 according to the first embodiment.

The symbol arrangement pattern selecting unit 135 constitutes a pattern selector configured to estimate reliability of the consecutive information symbols based on the propagation path conditions estimated by the propagation path condition estimating unit 132 and thereby to select an arrangement pattern (a predetermined pattern) so as to prevent the continued reception of unreliable information symbols at the receiver apparatus 200.

The symbol arrangement pattern selecting unit 135 notifies the symbol arranging unit 151 of the selected predetermined pattern.

The symbol arranging unit 151 is provided for arranging (mapping) the consecutive information symbols after error correction encoding along the direction of the frequency axis or the direction of the time axis in accordance with the predetermined pattern notified by the symbol arrangement pattern selecting unit 135.

As a result, the bits of the consecutive information symbols after error correction encoding are mapped into different data modulation symbols, and the information symbols after the data modulation are spread into the sub-carriers, which are consecutive over the spreading cycle, and then transmitted.

Figure 9:
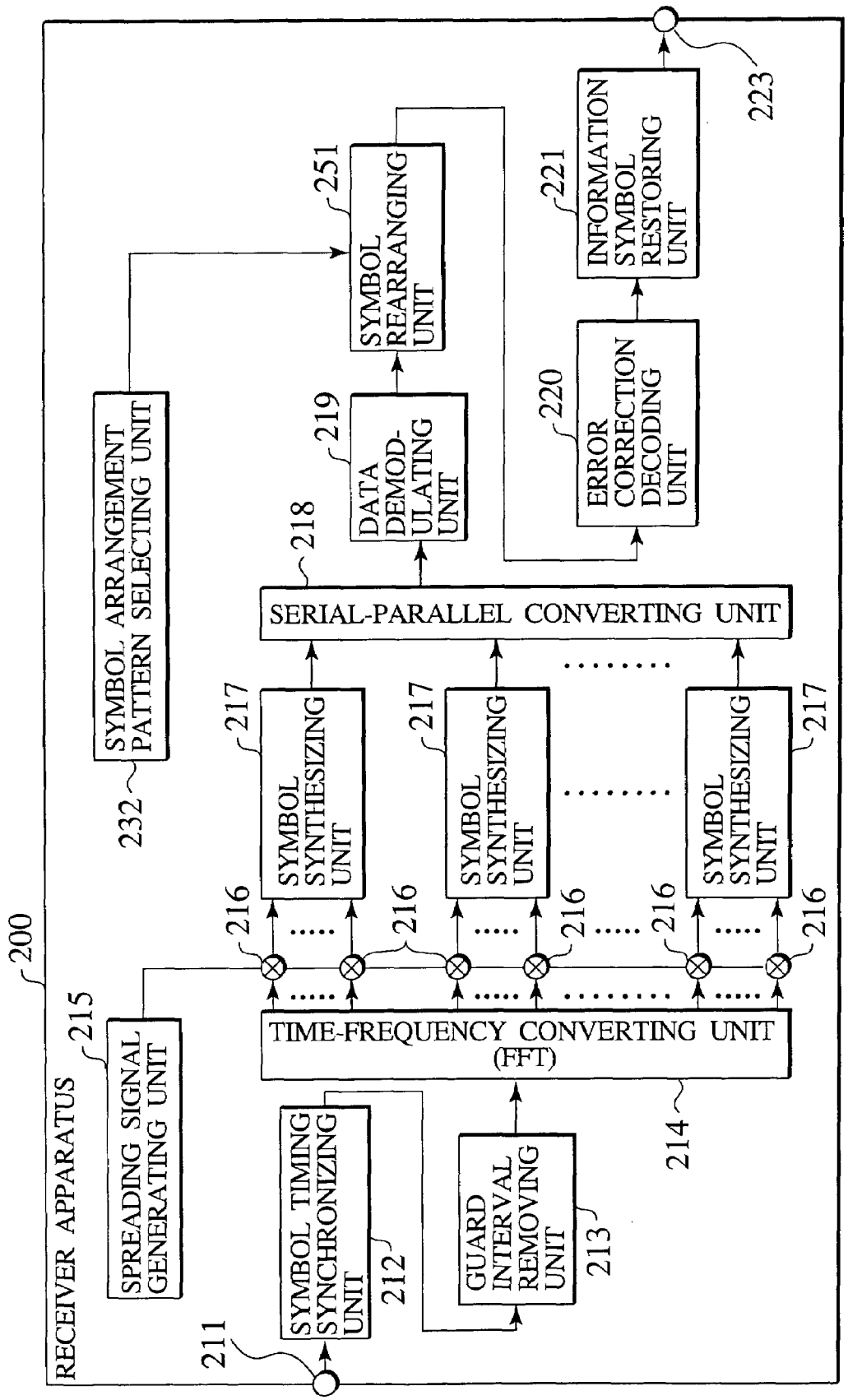
FIG. 9 is a functional block diagram of a receiver apparatus in the radio communication system according to the second embodiment of the present invention.

As shown in FIG. 9, the receiver apparatus 200 of this embodiment includes a symbol arrangement pattern selecting unit 232 instead of the symbol arrangement scheme selecting unit 231 provided to the receiver apparatus 200 according to the first embodiment.

Moreover, the receiver apparatus 200 of this embodiment includes only the symbol rearranging unit 251 instead of the plurality of symbol rearranging units 251 to 253 which are provided to the receiver apparatus 200 according to the first embodiment.

The symbol arrangement pattern selecting unit 232 is configured to instruct a reverse pattern to the predetermined pattern to the symbol rearranging unit 251 for use in rearrangement of the information symbols by the symbol rearranging unit 251.

For example, the symbol arrangement pattern selecting unit 232 may instruct the reverse pattern to the predetermined pattern to the symbol rearranging unit 251 for use in rearrangement of the information symbols by the symbol rearranging unit 251 based on an instruction from the transmitter apparatus 100.

Alternatively, the symbol arrangement pattern selecting unit 232 may instruct the reverse pattern to the predetermined pattern to the symbol rearranging unit 251 for use in rearrangement of the information symbols by the symbol rearranging unit 251 based on the estimated propagation path conditions.

The symbol rearranging unit 251 is configured to rearrange the information symbols after the data demodulation along the direction of the frequency axis or the direction of the time axis in accordance with the reverse pattern to the predetermined pattern.

An operation of the radio communication system of this embodiment will be described with reference to FIG. 10. FIG. 10 shows the operation of the transmitter apparatus 100 of the radio communication system of this embodiment.

Figure 10:
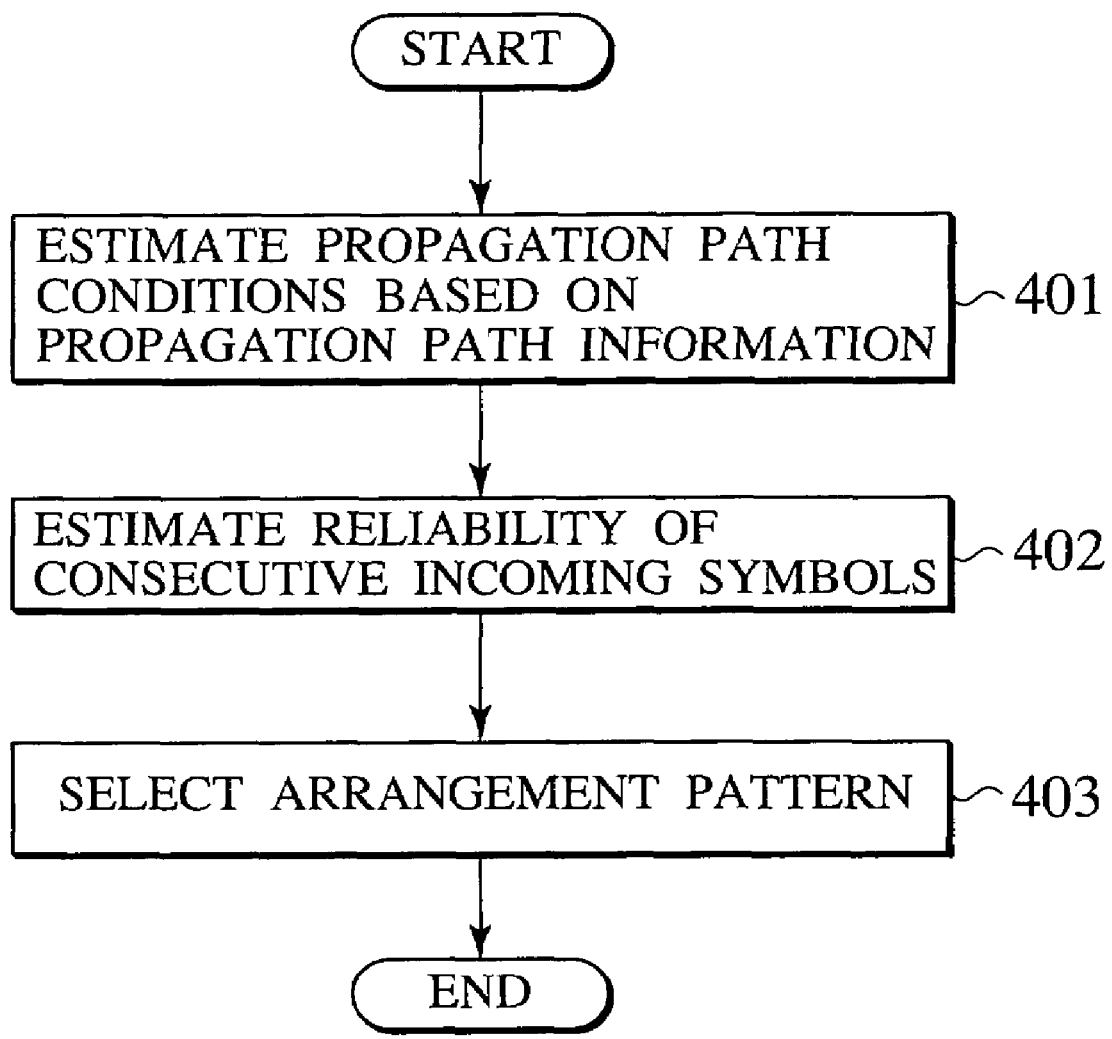
FIG. 10 is a flowchart showing operations of the transmitter apparatus in the radio communication system according to the second embodiment of the present invention.

As shown in FIG. 10, in Step 401, the propagation path condition estimating unit 132 of the transmitter apparatus 100 estimates the propagation path conditions between the transmitter apparatus 100 and the receiver apparatus 200 based on the propagation path information such as the incoming SINR, the delay spread or the maximum Doppler frequency.

In Step 402, the symbol arrangement pattern selecting unit 135 of the transmitter apparatus 100 estimates the reliability of the consecutive information symbols after error correction encoding.

In Step 403, the symbol arrangement pattern selecting unit 135 selects the arrangement pattern (the predetermined pattern) so as to prevent the continued reception of unreliable information symbols at the receiver apparatus 200.

[A Radio Communication System According to a Third Embodiment of the Present Invention]

A radio communication system according to a third embodiment of the present invention will be described with reference to FIG. 11 and FIG. 12. Here, the radio communication system of this embodiment will be described below mainly regarding differences from the radio communication systems according to the first and second embodiments.

Figure 11:
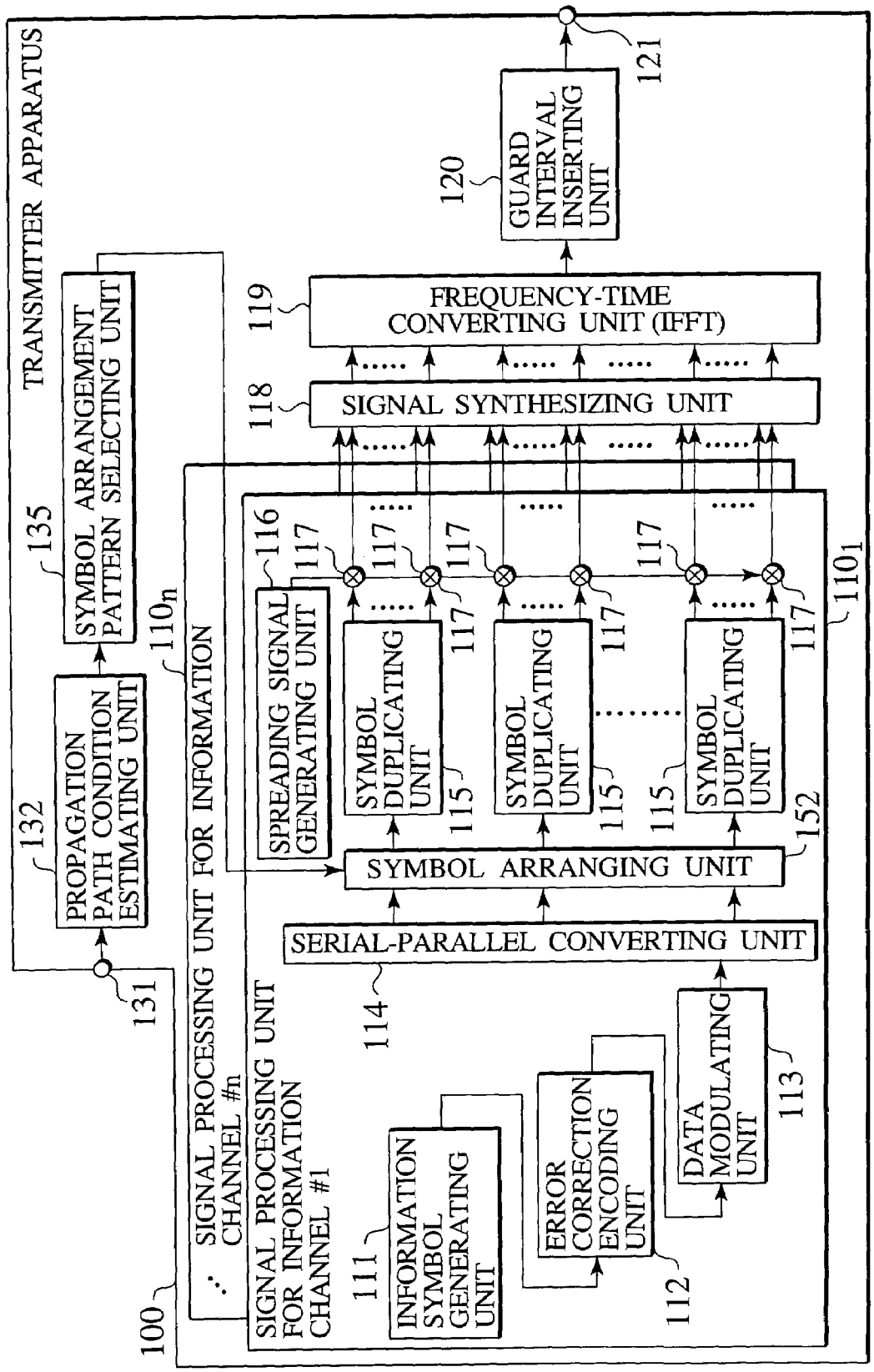
FIG. 11 is a functional block diagram of a transmitter apparatus in a radio communication system according to a third embodiment of the present invention.

As shown in FIG. 11, the transmitter apparatus 100 of this embodiment includes only the symbol arranging unit 152 instead of the plurality of symbol arranging units 151 to 153 which are provided to the transmitter apparatus 100 according to the first embodiment.

The symbol arranging unit 152 is provided for arranging (mapping) the consecutive information symbols after the data modulation along the direction of the frequency axis or the direction of the time axis in accordance with the predetermined pattern notified by the symbol arrangement pattern selecting unit 135.

Figure 12:
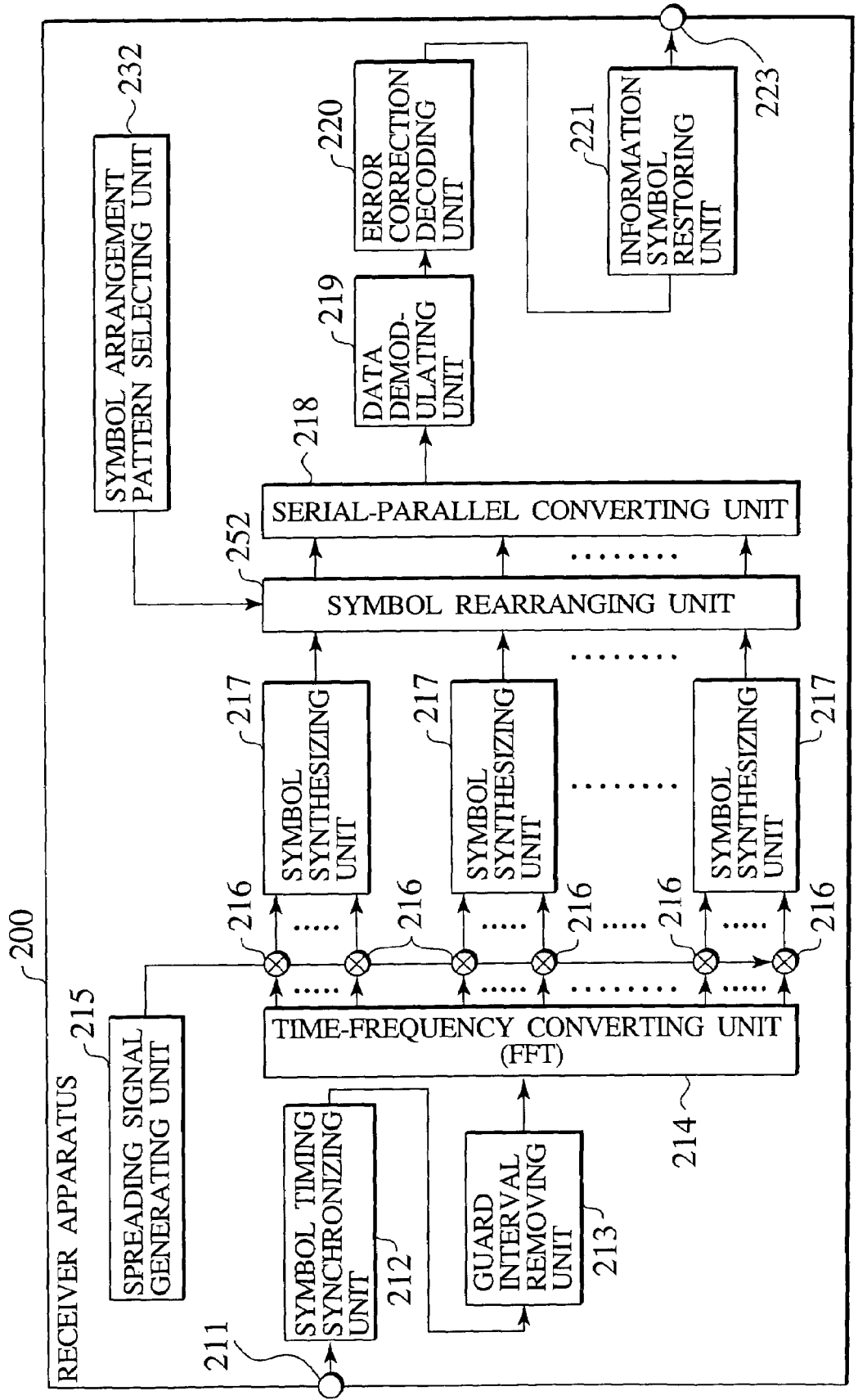
FIG. 12 is a functional block diagram of a receiver apparatus in the radio communication system according to the third embodiment of the present invention.

As shown in FIG. 12, the receiver apparatus 200 of this embodiment includes only the symbol rearranging unit 252 instead of the plurality of symbol rearranging units 251 to 253 which are provided to the receiver apparatus 200 according to the first embodiment.

The symbol rearranging unit 252 is configured to rearrange the information symbols after spreading along the direction of the frequency axis or the direction of the time axis in accordance with the reverse pattern to the predetermined pattern.

(A Radio Communication System According to a Fourth Embodiment of the Present Invention)

A radio communication system according to a fourth embodiment of the present invention will be described with reference to FIG. 13 and FIG. 14. Here, the radio communication system of this embodiment will be described below mainly regarding differences from the radio communication systems according to the first to third embodiments.

Figure 13:
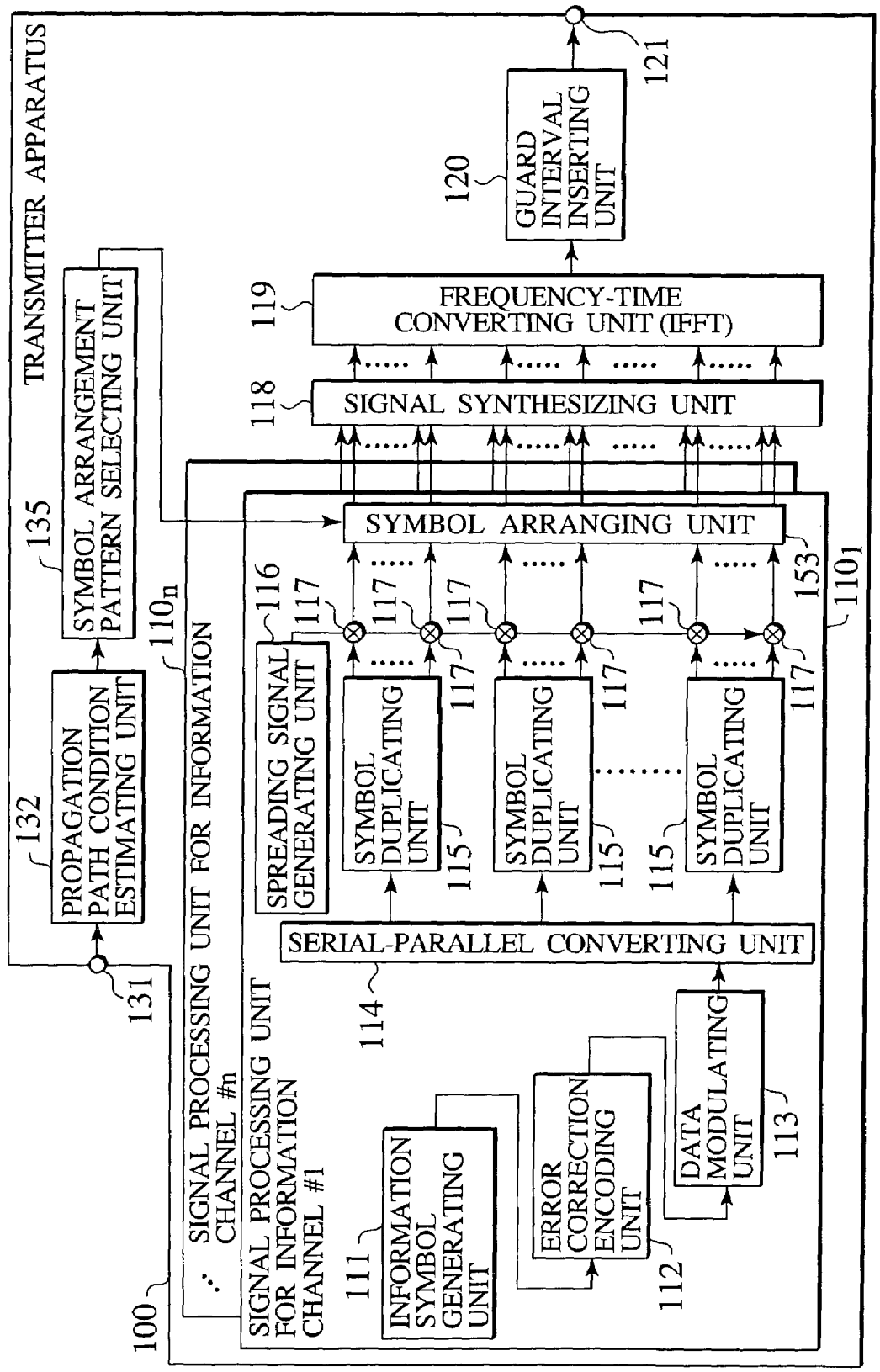
FIG. 13 is a functional block diagram of a transmitter apparatus in a radio communication system according to a fourth embodiment of the present invention.

As shown in FIG. 13, the transmitter apparatus 100 of this embodiment includes only the symbol arranging unit 153 instead of the plurality of symbol arranging units 151 to 153 which are provided to the transmitter apparatus 100 according to the first embodiment.

The symbol arranging unit 153 is provided for arranging (mapping) the chips, which spread the information symbols, along the direction of the frequency axis or the direction of the time axis in accordance with the predetermined pattern notified by the symbol arrangement pattern selecting unit 135.

In this configuration, the plurality of consecutive chips after spreading are transmitted by sub-carriers which are not consecutive over the spreading cycle. Alternatively, the symbol arranging unit 153 may perform the arrangement in a lump after the synthesis by the signal synthesizing unit 118.

Figure 14:
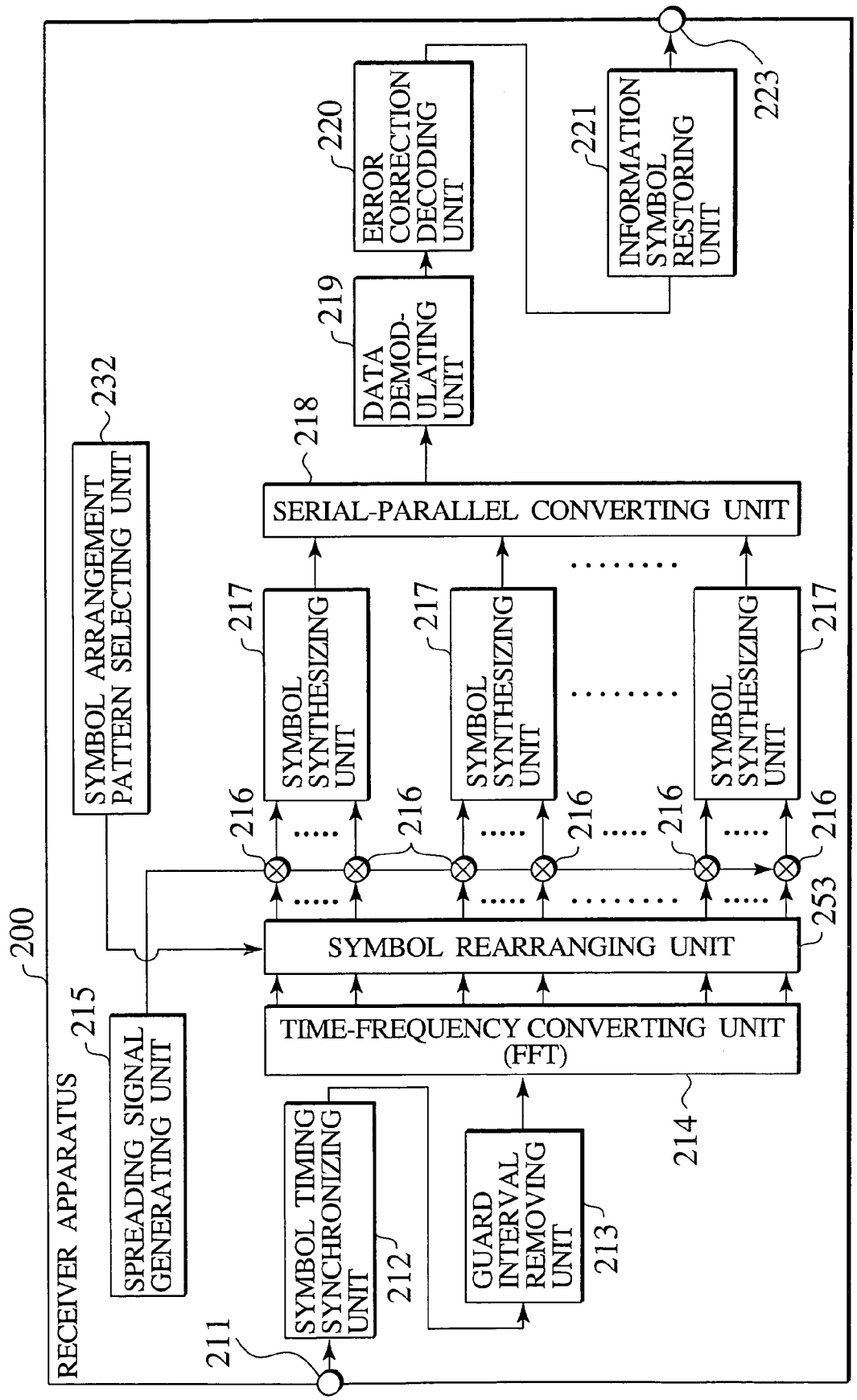
FIG. 14 is a functional block diagram of a receiver apparatus in the radio communication system according to the fourth embodiment of the present invention.

As shown in FIG. 14, the receiver apparatus 200 of this embodiment includes only the symbol rearranging unit 253 instead of the plurality of symbol rearranging units 251 to 253 which are provided to the receiver apparatus 200 according to the first embodiment.

The symbol rearranging unit 253 is configured to rearrange the chips after the time-frequency conversion along the direction of the frequency axis or the direction of the time axis in accordance with the reverse pattern to the predetermined pattern.

MODIFIED EXAMPLE

Here, in any of the second to fourth embodiments described above, it is possible to configure the radio communication system so as to include the symbol arranging units 151 to 153, and the symbol rearranging units 251 to 253, and to select one of the symbol arranging units and one of the symbol rearranging units to perform the above-described processing.

Figure 15:
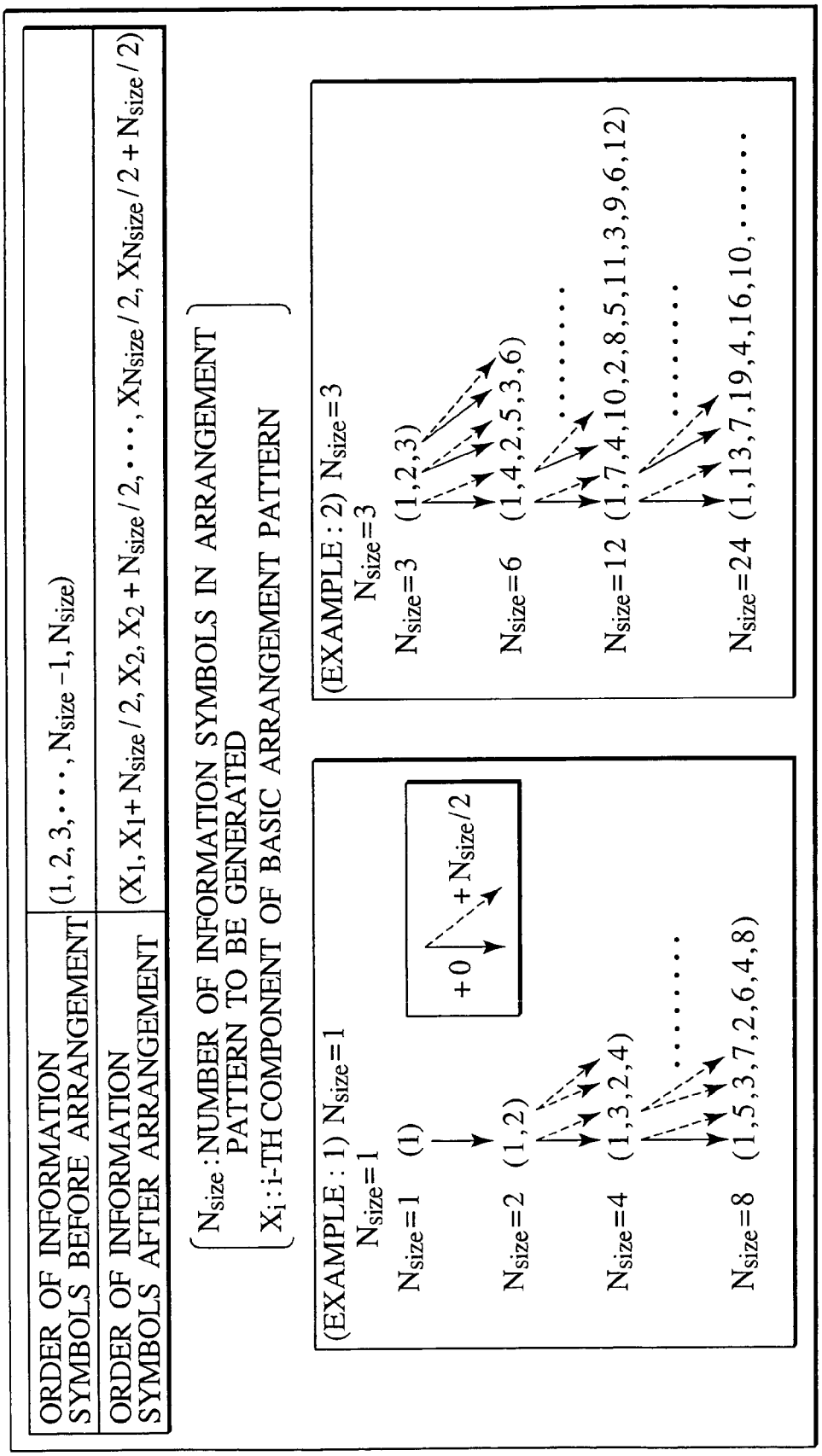
FIG. 15 is a view for explaining a method for generating an arrangement pattern used in the radio communication system according to a modified example of the present invention.

Moreover, as shown in FIG. 15, it is possible to generate the above-described predetermined pattern (the arrangement pattern) in response to the number of sub-carriers and the spreading cycle.

FIG. 15 shows a method in which the arrangement pattern ((1) or (1, 2, 3)) where the number $N_{size}$ of the information symbols subject to arrangement is 1 or 3 is taken as a basic pattern and the arrangement pattern having twice the number of the information symbols ($N_{size}=2$ or $N_{size}=6$) is generated therefrom.

To be more specific, in this method, the arrangement pattern ((1, 2) or (1, 4, 2, 5, 3, 6)) having twice the number of the information symbols are generated by adding values, which are obtained by adding the number of the information symbols ($N_{size}=1$ or $N_{size}=3$) of the basic arrangement pattern to the basic arrangement pattern ((1) or (1, 2, 3)), to the basic arrangement pattern serially.

Moreover, when the above-described operation is repeated by n times, it is possible to generate the arrangement pattern having 2 n times the number of the information symbols relative to the basic arrangement pattern.

When the order of the information symbols before arrangement is (1, 2, 3, ... $N_{size}-1$, $N_{size}$), the above-described method can be expressed by a general formula as ($X_1$, $X_1+N_{size}/2$, $X_2$, $X_2+N_{size}/2$, ..., $X_{Nsize}/2$, $X_{Nsize}/2+N_{size}/2$), which is the order of the information symbols after arrangement.

Here, reference code $N_{size}$ denotes the number of the information symbols in the arrangement pattern to be generated.

Meanwhile, reference code $X_i$ denotes an i-th component of the basic arrangement pattern.

As a result, it is possible to generate the arrangement pattern in response to the configuration of the symbol arrangement, the number of the sub-carriers or the spreading cycle.

As described above, according to the present invention, it is possible to configure the OFCDM radio communication system so as to prevent the continued reception of the unreliable information symbols at the receiver apparatus 200. In this way, it is possible to improve the transmission quality.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio communication system for performing a radio communication by combining the OFDM modulation method and the CDMA modulation method, the system comprising:
   a transmitter apparatus, including a single symbol arranger for each information channel configured to arrange information symbols along a direction of a frequency axis in accordance with an arrangement pattern, configured to estimate conditions of propagation paths used in the radio communication, to select the arrangement pattern for the single symbol arranger based on the estimated conditions of the propagation paths, to notify the single symbol arranger of the selected arrangement pattern, and to transmit a radio communication signal including the arranged information symbols; and
   a receiver apparatus configured to receive the radio communication signal, and to rearrange the information symbols included in the radio communication signal along the direction of the frequency axis in accordance with a reverse pattern to the arrangement pattern.

2. The radio communication system according to claim 1, wherein the transmitter apparatus is further configured to receive transmission parameter information specific to the radio communication signal including the arranged information symbols, and to select the arrangement pattern for the single symbol arranger based on the received transmission parameter information.

3. A radio communication method for performing a radio communication by combining the OFDM modulation method and the CDMA modulation method, the method comprising:
   estimating conditions of propagation paths used in the radio communication arranging information symbols along a direction of a frequency axis in accordance with an arrangement pattern by a single symbol arranger for each information channel, selecting the arrangement pattern for the single symbol arranger based on the estimated conditions of the propagation paths, notifying the single symbol arranger of the selected arrangement pattern, and transmitting a radio communication signal including the arranged information symbols, in a transmitter apparatus; and
   receiving the radio communication signal, and rearranging the information symbols included in the radio communication signal along the direction of the frequency axis in accordance with a reverse pattern to the arrangement pattern, in a receiver apparatus.

4. The radio communication method according to claim 3, wherein selecting the arrangement pattern, in the transmitter apparatus, further includes selecting the arrangement pattern for the single symbol arranger based on received transmission parameter information specific to the radio communication signal including the arranged information symbols.

5. A transmitter apparatus used in a radio communication system for performing a radio communication by combining the OFDM modulation method and the CDMA modulation method, wherein
   the transmitter apparatus, including a single symbol arranger for each information channel configured to arrange information symbols along a direction of a frequency axis in accordance with an arrangement pattern, is configured to estimate conditions of propagation paths used in the radio communication, to select the arrangement pattern for the single symbol arranger based on the estimated conditions of the propagation paths, to notify the single symbol arranger of the selected arrangement pattern, and to transmit a radio communication signal including the arranged information symbols.

6. The transmitter apparatus according to claim 5, wherein the single symbol arranger is selected from a plurality of symbol arrangers configured to arrange the information symbols along the direction of the frequency axis in accordance with the arrangement pattern,
   the apparatus further comprising:
      a propagation path condition estimator configured to estimate the conditions of the propagation paths;
      a symbol arrangement scheme selector configured to select the single symbol arranger from among the plurality of symbol arrangers; and
      a signal transmitter configured to transmit the radio communication signal including the arranged information symbols.

7. The transmitter apparatus according to claim 6, wherein the single symbol arranger is selected from the plurality of symbol arrangers comprising:
   a first symbol arranger configured to arrange the information symbols after error correction encoding along the direction of the frequency axis in accordance with the arrangement pattern;
   a second symbol arranger configured to arrange the information symbols after data modulation along the direction of the frequency axis in accordance with the arrangement pattern; and
   a third symbol arranger configured to arrange the chips which spread the information symbols along the direction of the frequency axis in accordance with the arrangement pattern.

8. The transmitter apparatus according to claim 5, wherein the single symbol arranger is a symbol arranger configured to arrange the information symbols after error correction encoding along the direction of the frequency axis in accordance with the arrangement pattern.

9. The transmitter apparatus according to claim 5, wherein the single symbol arranger is a symbol arranger configured to arrange the information symbols after data modulation along the direction of the frequency axis in accordance with the arrangement pattern.

10. The transmitter apparatus according to claim 5, wherein the single symbol arranger is a symbol arranger configured to arrange chips which spread the information symbols along the direction of the frequency axis in accordance with the arrangement pattern.

11. The transmitter apparatus according to claim 5, wherein the single symbol arranger is configured to arrange the information symbols along both the direction of the frequency axis and a direction of a time axis.

12. The transmitter apparatus according to claim 5, wherein the transmitter apparatus is further configured to receive transmission parameter information specific to the radio communication signal including the arranged information symbols, and to select the arrangement pattern for the single symbol arranger based on the received transmission parameter information.

* * * * *